US006535183B2

(12) United States Patent
Melville et al.

(10) Patent No.: US 6,535,183 B2
(45) Date of Patent: *Mar. 18, 2003

(54) AUGMENTED RETINAL DISPLAY WITH VIEW TRACKING AND DATA POSITIONING

(75) Inventors: Charles D. Melville, Issaquah, WA (US); Richard S. Johnston, Issaquah, WA (US)

(73) Assignee: University of Washington, Seattle, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/569,347

(22) Filed: May 11, 2000

(65) Prior Publication Data

US 2002/0175880 A1 Nov. 28, 2002

Related U.S. Application Data

(62) Division of application No. 09/009,579, filed on Jan. 20, 1998, now Pat. No. 6,097,353.

(51) Int. Cl.⁷ .................................................. G09G 5/00
(52) U.S. Cl. .................................... 345/8; 345/7; 345/9
(58) Field of Search ....................... 345/7, 8, 9; 359/629, 359/630, 631, 634, 636; 396/57

(56) References Cited

U.S. PATENT DOCUMENTS

| | | | | |
|---|---|---|---|---|
| 5,181,133 A | * | 1/1993 | Lipton | 359/84 |
| 5,467,104 A | * | 11/1995 | Furness, III et al. | 345/8 |
| 5,596,339 A | * | 1/1997 | Furness, III et al. | 345/8 |
| 5,870,068 A | * | 2/1999 | Hildebrand et al. | 345/7 |

* cited by examiner

Primary Examiner—Vijay Shankar
(74) Attorney, Agent, or Firm—Steven P. Koda

(57) ABSTRACT

A scanned beam tracking system is included in a virtual retinal display. An infrared light source generates light for scanning the viewer's environment in the direction the viewer is looking. A visible light source generates visible light which is scanned on a viewer's retina to generate a virtual image. A common scanning system is used to scan both the non-visible light and the visible light. The visible light is directed into the viewer's eye. The non-visible light is directed away from the viewer's eye into the environment. Infrared reflectors are positioned in the environment. When the infrared light from the virtual retinal display scans over a reflector the reflector directs the infrared light back toward the virtual retinal display. The current pixel of the scanning cycle when the infrared return light is detected corresponds to the position of the reflector.

6 Claims, 5 Drawing Sheets

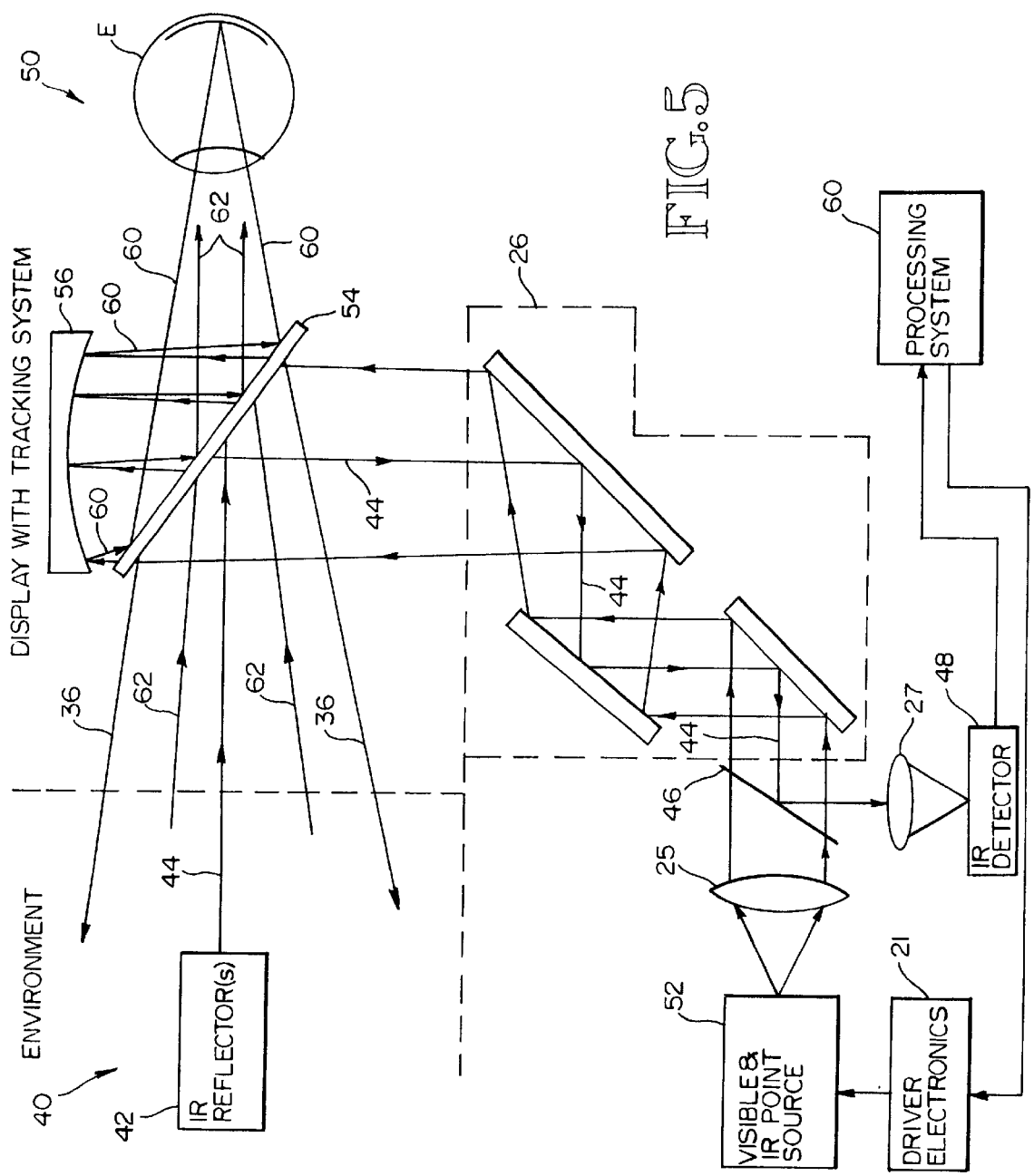

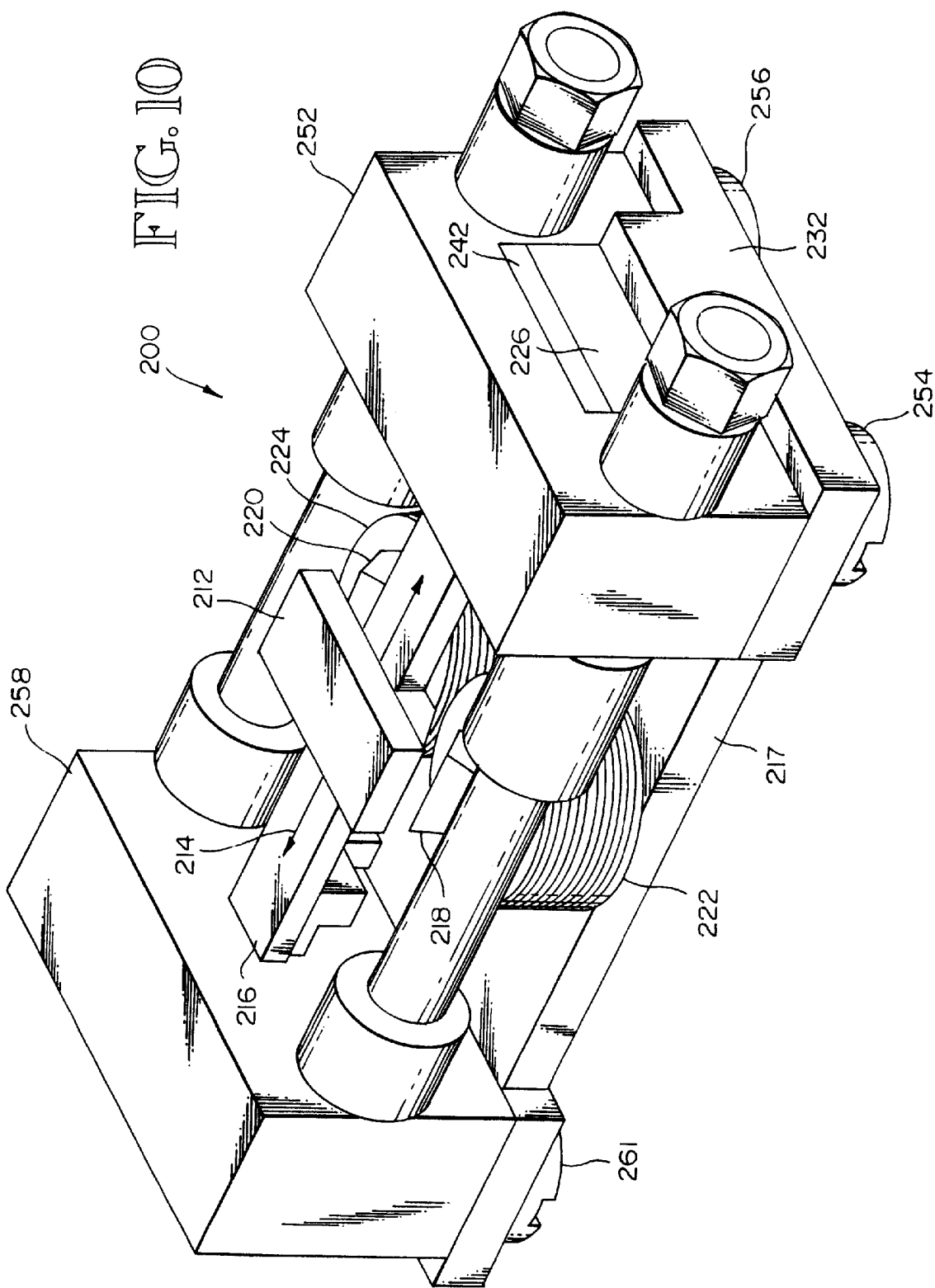

AUGMENTED RETINAL DISPLAY WITH VIEW TRACKING AND DATA POSITIONING

CROSS REFERENCE TO RELATED APPLICATIONS

This is a division of U.S. patent application Ser. No. 09/009,579 filed Jan. 20, 1998 now U.S. Pat. No. 6,097,353 for "Augmented Retinal Display with View Tracking and Data Positioning." The content of that application is incorporated herein by reference and made a part hereof.

BACKGROUND OF THE INVENTION

This invention relates to augmented virtual retinal display devices, and more particularly to a system for tracking viewer position and for adding data to a view based upon viewer position.

A virtual retinal display device is an optical device for generating an image upon the retina of an eye. Light is emitted from a light source, passed through a lens, then deflected along a scan path by a scanning device. At a distance defined by the lens the scanned light converges to a focal point for each pixel position. As the scanning occurs the focal point moves along to define an intermediate image plane. The light then diverges beyond the plane. An eyepiece is positioned along the light path beyond the intermediate image plane at some desired focal length. An "exit pupil" occurs shortly beyond the eyepiece in an area where a viewer's eye pupil is to be positioned.

A viewer looks into the eyepiece to view an image. The eyepiece receives light that is being deflected along a raster pattern. Light thus impinges on the viewer's eye pupil at differing angles at different times during the scanning cycle. This range of angles determines the size of the image perceived by the viewer. Modulation of the light during the scanning cycle determines the content of the image.

An augmented virtual retinal display is a see-through display which overlays an image onto a background. The overlaid image is a virtual image. The background is a real world view of the ambient environment. The overall image is formed by adding light to the background. The added light corresponds to the virtual image. The virtual image appears to be transparent because in the display portion at which the image is formed, light from both the virtual image and the background impinge on the same photoreceptors in the viewer's eye.

SUMMARY OF THE INVENTION

According to the invention, a scanned beam tracking system is included in a virtual retinal display. The function of the tracking system is to provide information for determining where a user is looking. In a preferred embodiment head position and orientation is tracked. Information is displayed based upon the viewer's eye position.

According to one aspect of the invention, a non-visible light source (e.g., infrared light source) generates light for scanning the viewer's environment in the direction the viewer's head is looking. A visible light source generates visible light which is scanned on a viewer's retina to generate a virtual image. A common scanning system is used to scan both the non-visible light and the visible light. The visible light is directed into the viewer's eye. The non-visible light is directed away from the viewer's eye into the environment. Thus, the scanning rate for the tracking system is the same as the scanning rate for the virtual display.

According to another aspect of the invention, a beamsplitter with an infrared mirror reflects the infrared light away from the viewer's eye toward the environment, while passing visible light (e.g., virtual image and background light from environment) toward from the viewer's eye.

According to another aspect of the invention, infrared reflectors are positioned in the environment. When the infrared light from the virtual retinal display scans over a reflector the reflector directs the infrared light back toward the virtual retinal display. The virtual retinal display beamsplitter with infrared mirror deflects such light away from the viewer's eye along a path toward an infrared detector. The round trip time of the infrared light is substantially less than the scanning time for scanning an image frame onto the viewer's retina. Thus, the position of the reflector is known relative to the scanning cycle. Specifically, the current pixel of the scanning cycle when the infrared return light is detected corresponds to the position of the reflector.

According to another aspect of this invention, multiple reflectors are positioned in the environment. In some embodiments, a reflector has a reflection pattern identification which allows the system to know which reflector or which type of reflector is being scanned at a given time during the scan cycle.

According to another aspect of this invention, when at least three reflectors are scanned during a given scan cycle, the system can triangulate a precise position of the user relative to such reflectors.

According to another aspect of the invention, an image, graphic information or text information is added to the display imagery when a reflector is scanned. In one embodiment, such added information is stabilized relative to the head position. For example, such information is always displayed at a prescribed portion of the display (e.g., upper right portion) when a reflector is scanned. In another embodiment such information is fixed relative to the background environment. In an exemplary embodiment the reflector is placed upon a target object. When the reflector is detected, the target object is within the field of view of the user. Textual information about the target object is displayed in a prescribed portion of the field of view (e.g., lower right corner). Even when the user's head moves, the textual information stays fixed in the prescribed portion of the field of view as long as the target object remains within the field of view. Once the user looks in a direction which excludes the target object from the field of view, the textual information is removed. Thus, the added information is stabilized relative to the head.

In another embodiment the added information is stabilized relative to the background. For example, a predetermined virtual image is overlaid onto the background at a position registered to the background (e.g., a virtual image ornament is displayed to appear on a given branch of a real tree within the real background viewed by the user). Even when the viewer's head moves (and thus the virtual retinal display), as long as the desired location is still within view of the user, then the information is added to the display at a point fixed relative to the background (e.g., the virtual ornament appears at the same spot on the real tree).

According to another aspect of the invention, the working volume for the tracking system corresponds to the field of view of the retinal display. Thus, any reflectors within the field of view are detected.

According to another aspect of the invention, an augmented virtual retinal display system with view tracking receives an image data signal for generating a virtual image upon a viewers eye. The system also receives background light from a real environment for passing a real environment background image to the viewer's eye. The system has a field of view for viewing the real environment and the virtual image. The system includes a light source for generating visible light and infrared light. A modulator modulates the visible light as a function of the image data signal to define a sequence of display pixels forming the virtual image. A scanner receives the infrared light and the modulated visible light, and deflects the received visible light and infrared light along a raster pattern. The scanned visible light and infrared light impinge on a beamsplitter. The beamsplitter includes a coating at the incident surface which is reflective to the infrared light. The infrared light is reflected off the infrared reflective coating into the real environment. The scanned visible light passes through the infrared reflective coating then is in-part reflected and in-part passed. The reflected portion of the visible light enters the real environment. The passed portion impinges on a concave mirror, then is reflected back to the beamsplitter, and in turn, deflected toward the viewer's eye. Also impinging on the infrared reflective portion of the beamsplitter is the background light and the returning infrared light reflected from the real environment. Background light passes through the beamsplitter and travels a path destined for the viewer's eye. An infrared reflector is located in the real environment. Scanned infrared light from the display enters the real environment, (e.g., along the raster scanning pattern). Some of such infrared light is reflected back to the display. More specifically, when the infrared reflector is within a field of view of the scanning pattern, the infrared light impinges on the reflector and is reflected back onto the infrared reflective coating of the beamsplitter. The coating reflects the re-entering infrared light along a path within the display destined for an infrared detector. The infrared detector generates a first signal in response to detection of the re-entering infrared light.

According to another aspect of the invention, the infrared reflector includes a center area reflective to infrared light and a plurality of spaced concentric rings reflective to infrared light.

According to another aspect of the invention, the system is used in combination with a processing system. The processing system generates the image data signal and receives the first signal. The processor correlates the detection of the re-entering infrared light to a display pixel among the sequence of display pixels forming the virtual image. The processing system also embeds display data into the image data signal responsive to the received first signal. The embedded display data corresponds to virtual imagery fixed relative to the field of view and/or to virtual imagery fixed relative to the infrared reflector in the environment.

According to another aspect of the invention, a method for overlaying a virtual image onto a real background image with an augmented virtual retinal display having view tracking is provided. The augmented virtual retinal display apparatus receives an image data signal for generating pixels of the virtual image upon a viewer's eye and receives background light from a real environment for passing the real background image to the viewer's eye. The method includes generating visible light and infrared light, and modulating the visible light as a function of the image data signal to define a sequence of display pixels forming the virtual image. At another step the received visible light and infrared light are deflected along a raster pattern. At another step the deflecting infrared light is received at an infrared mirror and deflected into the real environment. At another step the deflecting visible light is received at a beamsplitter and deflected the visible light toward a viewer's eye. At another step the background light is received at the beamsplitter. A portion of the background light is passed toward the viewer's eye. At another step the infrared light deflected into the real environment is reflected by an infrared reflector located in the real environment back to the infrared mirror as re-entering infrared light. At another step the re-entering infrared light is detected at an infrared detector. At another step a pixel of the virtual image is correlated with the detected re-entering infrared light.

According to one advantage of this invention, there is a latency of less than one display frame period between when a reflector is detected and when information responsive to such detection is added to the display. According to another advantage of the invention, the positioning of information added to the display as function of reflector detection is accurate to within one display pixel. These and other aspects and advantages of the invention will be better understood by reference to the following detailed description taken in conjunction with the accompanying drawings.

BRIEF DESCRIPTION OF THE DRAWINGS

FIG. 5 is an optical schematic of an augmented virtual retinal display with viewer tracking system according to an embodiment of this invention;

FIG. 10 is a perspective view of an exemplary scanning subsystem for the display of FIG. 2.

DESCRIPTION OF SPECIFIC EMBODIMENTS

Overview

Figure 1:
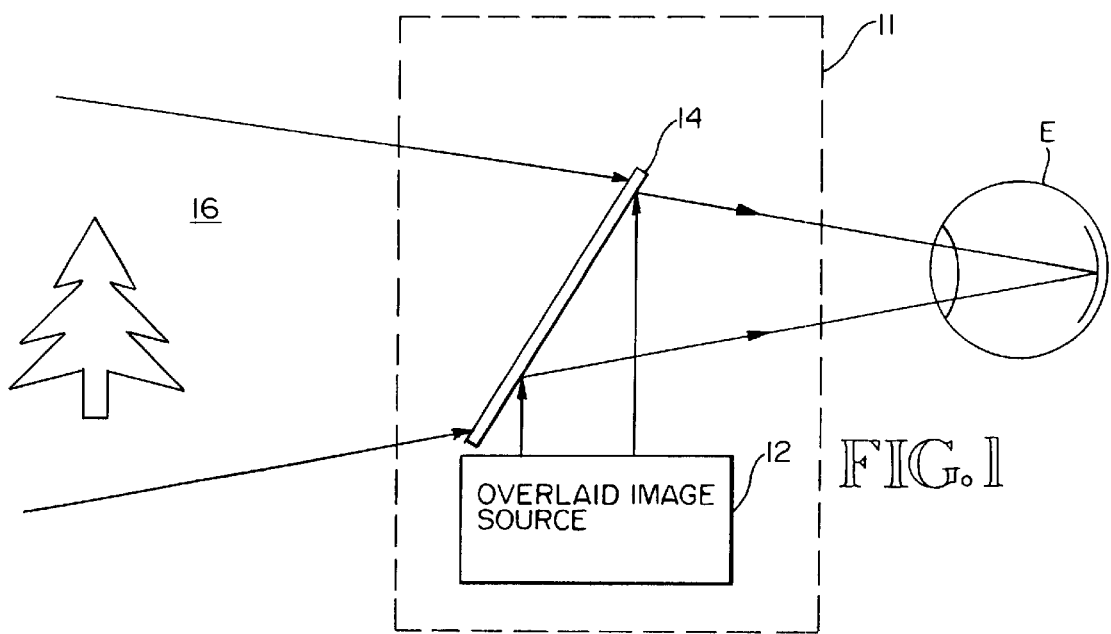
FIG. 1 is a block diagram of a conventional augmented display.
Figure 3:
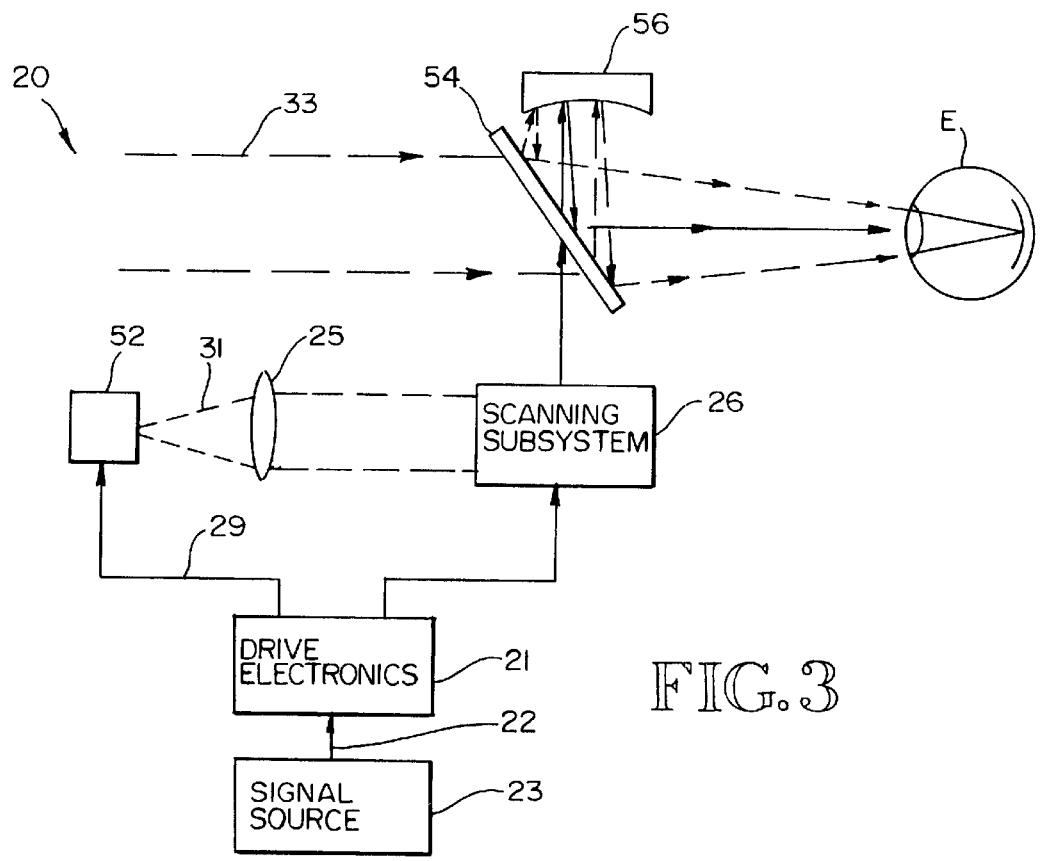
FIG. 3 is a block diagram of the virtual retinal display portion of FIG. 2.
Figure 2:
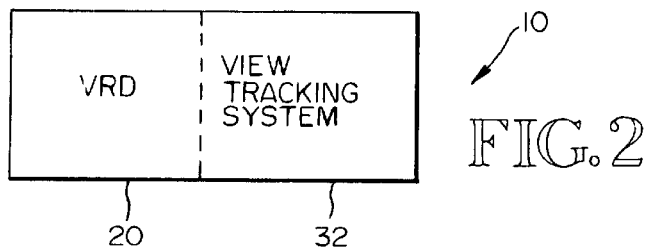
FIG. 2 is a block diagram of an augmented display having a virtual retinal display and an integral viewer tracking system.

FIG. 1 shows a block diagram of a conventional augmented display 11. The augmented display 10 is a see-through display which passes light from the ambient environment background toward a viewer's eye E. A virtual image generated from an image source 12 is overlaid onto the background light impinging the eye. A beamsplitter 14 directs the combined image to the eye E. In some applications, such as light simulators, the background light alternatively may be provided by an image source such as a display screen, rather than by the environment. Referring to FIG. 2, an augmented display 10 according to an embodiment of this invention is formed by a virtual retinal display or other scanning display 20 with an integral view tracking system 32. Referring to FIG. 3, the virtual retinal display 20 generates and manipulates light to create color or monochrome virtual images having narrow to panoramic fields of view and low to high resolutions. The virtual retinal display 20 includes drive electronics 21 (e.g., image data interface), one or more light sources 52, a lensing or optics subsystem 25, a scanning subsystem 26, a beamsplitter 54 and a concave mirror 56. In a preferred embodiment, the beamsplitter and mirror serve as an eyepiece. In other embodiments another lens (not shown) is included to serve as an eyepiece.

The virtual retinal display 20 receives an image signal 22 from an image source 23, such as a computer device, video device or other digital or analog image data source. The image signal 22 is an RGB signal, NTSC signal, VGA signal, SVGA signal, or other formatted color or monochrome video or image data signal. In response to the image signal 22, the drive electronics 21 generate signals 29 for controlling the light source 52. The light source 52 includes one or more point sources of light. In one embodiment red, green, and blue light sources are included. In one embodiment the light source 52 is directly modulated. That is, the light source 52 emits light with an intensity corresponding to the drive signal 29. In another embodiment the light source 52 outputs light 31 with a substantially constant intensity that is modulated by a separate modulator in response to the signal 29. The light 31 output along an optical path thus is modulated according to image data within the image signal 22. Such modulation defines image elements or image pixels. Preferably the emitted light 31 is spatially coherent.

The light 31 is output to the optics subsystem 25 and the scanning subsystem 26. The scanning subsystem 26 includes a horizontal scanner and a vertical scanner. In one embodiment, the horizontal scanner includes a mechanical resonator for deflecting passing light, such as that described in U.S. Pat. No. 5,557,444 to Charles D. Melville entitled, "Miniature Optical Scanner for a Two Axis Scanning System," which is incorporated herein by reference. Alternatively, the horizontal scanner may be an acousto-optic device or a resonant or non-resonant microelectromechanical device. Typically the light is deflected along a raster pattern, although in an alternative embodiment another display format such as vector imaging can be used. In one embodiment the scanning subsystem 26 receives a horizontal deflection signal and a vertical deflection signal from the drive electronics 21.

The scanning subsystem 26 deflects the light along a raster pattern toward the eye E, or as in the embodiment illustrated, toward the beamsplitter 54. The beamsplitter 54 is useful for an augmented display which passes both background light 33 and image light 31 to the viewer's eye E. The concave mirror 56 focuses the light onto the eye E. The image pixels scanned onto the viewer's eye define a virtual image. The virtual image is updated and rescanned periodically so that the viewer perceives a continuous image.

Figure 4:
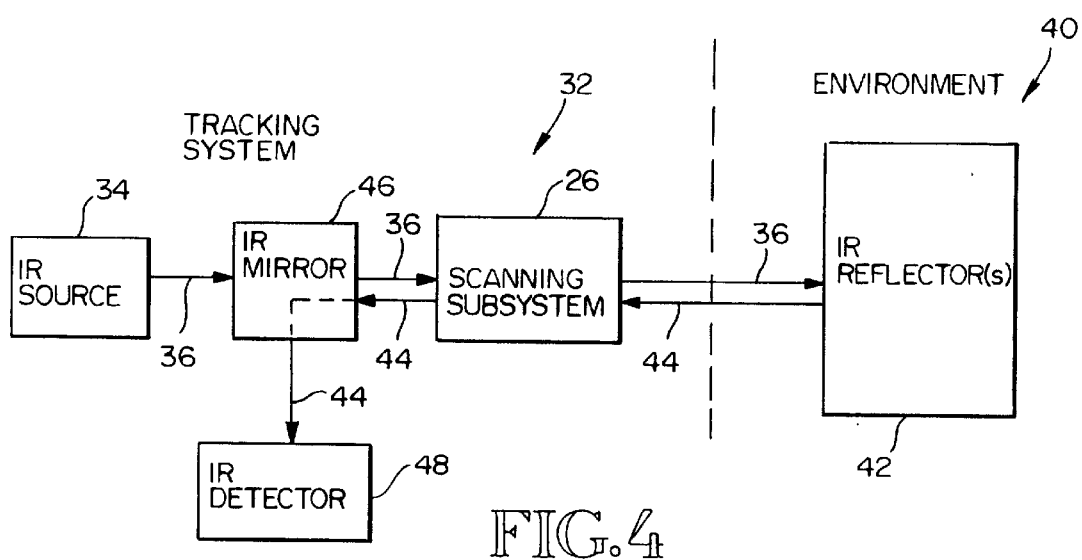
FIG. 4 is a block diagram of the viewer tracking system of FIG. 2 according to an embodiment of this invention.

As shown in FIG. 4 the tracking system 32 includes a tracking light source 34. Although an infrared source is illustrated and preferred, other non-visible light sources (e.g., ultraviolet), electromagnetic wave sources, or visible light sources are used in alternative embodiments. The infrared light 36 enters the scanning system 26 which, in a preferred embodiment, deflects the light along a raster pattern. The deflected light strikes the beamsplitter 54 and because the beamsplitter 54 includes a wavelength selective coating, the beamsplitter 54 selectively deflects the infrared light 35 toward the ambient environment 40. If during a scan pattern in the environment 40, the infrared light 36 impinges on an infrared deflector 42, it is reflected back to the scanning system 26 as reflected infrared light 44. The reflected light 44 passes from the scanning subsystem 26 to an infrared mirror 46. The mirror 46 deflects the reflected light 44 to an infrared detector 48.

The round trip time for the infrared light 36, 44 is much less than the scan period for the scanning subsystem 26. As a result, the timing of when the infrared light encounters the IR reflector 42 is known to within one pixel of the virtual image scanned onto the eye E for most applications. For example, according to a preferred embodiment, the scanning system 26 deflects the visible light along a raster scan at a rate fast enough to avoid an appearance of flickering at the viewer's eye. Typical scanning rates are 30 Hz, 60 Hz or 72 Hz. For an display with 480×640 pixel resolution and a 60 Hz scanning rate, the scanning subsystem 26 moves one pixel in $1/(480*640*60)$ seconds, which is $5.42 \times 10^{-8}$ seconds. As long as the round trip time of the infrared light 36, 44 is less than such time, then the reflector 42 is accurately associated with a given pixel of the scanning cycle to within one pixel. Light travels approximately 50 feet in $5.42 \times 10^{-8}$ seconds. Thus, any reflector 42 within 50 feet of the display 20 and tracking system 32 can be registered to within one pixel.

Display With Tracking System

FIG. 5 shows a display apparatus 50 according to an embodiment of this invention. The display apparatus 50 includes the virtual retinal display 20 and the tracking system 32. The apparatus 50 includes a point source 52 which generates both visible light for scanning a virtual image onto an eye E and infrared light for scanning the environment 40. The visible light emissions are modulated based upon image data received from a processing system 60 via an image data interface 21. The infrared emissions are uninterrupted during a scanning cycle. The light emissions, visible and infrared, pass through an optical lens 90 of an optics subsystem 25, then through a partial infrared mirror 46. In the direction of light impinging from the source 52 side of the mirror 46, both the visible light and the infrared light pass undeflected to the scanning subsystem 26.

The scanning subsystem 26 includes a vertical scanner and a horizontal scanner for deflecting the visible light and infrared light along a raster pattern, as is described in greater detail below. The light emerging from the scanning subsystem 26 impinges upon the beamsplitter 54. The side of the beamsplitter receiving light from the scanning subsystem 26 also is coated with a film to serve as an infrared mirror. Some visible light 60 passes through the beamsplitter 54. Infrared light 36 is reflected off the mirror side of the beamsplitter 54. The passed visible light travels toward a concave mirror 56 which reflects the light back to the beamsplitter 54, and in turn, toward the eye E. The curvature of the concave mirror 56 is selected so that the visible light 60 travelling from the beamsplitter 54 toward the viewer's eye E is focused appropriately for viewing by the eye E. The modulated scanned visible light thus forms a virtual image.

In addition to directing the scanned light toward the eye E, the beamsplitter 54 also transmits visible light 62 from the environment 40 toward the viewer's eye E. Thus, the viewer's sees both the visible light 62 from the background and the visible light 60 from a generated virtual image.

The infrared light 36 reflected off the infrared mirror side of the beamsplitter 54 is directed into the environment 40. Thus, the beamsplitter with infrared mirror serves to direct visible light toward the viewer's eye E and infrared light away from the viewer's eye. Such infrared light is deflected by the scanning subsystem 26 along a raster pattern. Thus, the infrared light 36 scans the environment 40. The infrared light 36 deflected along the raster pattern scans the field of view of the viewer.

According to an aspect of this invention, one or more infrared reflectors are positioned within the environment 40. When infrared light 36 impinges on a reflector 42, infrared light 44 is reflected back to the beamsplitter 54. The infrared light 44 is reflected off the mirror side of the beamsplitter 54 back toward the scanning system 26. The infrared light 44 is reflected off mirrors of the scanning system to travel back toward the light source 52. After emerging from the scanning subsystem 26 along the return path, the infrared light encounters a one-way, partially-reflective, infrared mirror 46, prior to the light source 52. The infrared mirror 46 deflects the infrared light 44 to an infrared detector 48. As described above, the round trip time of the infrared light 36, 44 is less than the time it takes the scanning system 26 to deflect light by one pixel (for a reflector 42 within approximately 50 feet of the apparatus 50). A processing system 60 receives an indication from the detector 48 and registers the detection of an infrared reflector 42 with a current pixel. Following is a description of alternative methods for processing a detection of an infrared reflector 42.

Methods for Processing Detection of an Infrared Reflector

Figure 6:
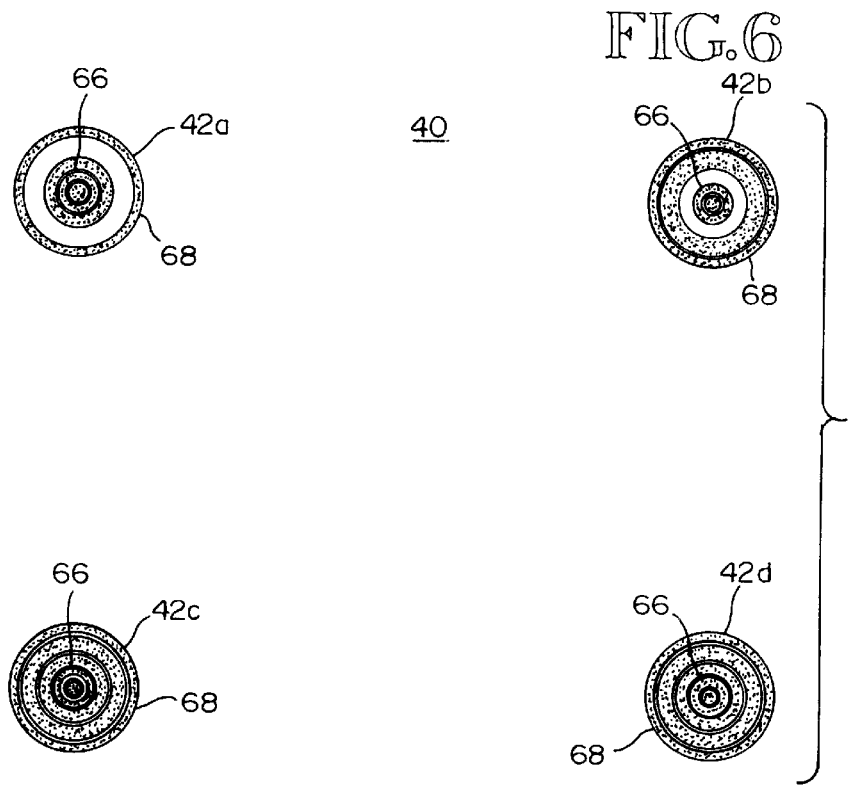
FIG. 6 is a diagram of a set of reflectors placed in the viewing environment according to an embodiment of this invention.

FIG. 6 shows a set of infrared reflectors 42a–42d occurring in the environment 40. According to one embodiment, each reflector 42 forms a ring pattern. Each ring pattern includes a center 66 and one or more concentric rings at odd or similar spacing from the center 66. The ring patterns are formed from conventional reflective or retroreflective materials. For example, low reflective regions of the ring patterns may be formed from a dark ink, while high reflective regions may be formed from a glass, uncoated paper, plastic, metal or commercially available retroreflective materials. As a result, when a reflector 42 is scanned, the reflected light is modulated according to the pattern of reflectivity of the target in a similar fashion to a bar code or other two dimensional symbol reading. The reflectors can have the same or differing ring patterns depending on the application. For example, to distinguish individual reflectors 42a–42d, unique ring patterns are used. Alternatively, reflectors can be identified in groups. For example, if two reflectors are used to indicate the same type of object in the environment, then the two reflectors could have the same ring pattern. Additionally, if multiple reflectors 42 are placed at known locations in the environment, then a position for the source of the scanning light (e.g., the apparatus 50) can be triangulated.

According to one embodiment of the invention, information is added to the display imagery when a reflector 42 is encountered during a scan pattern. In one embodiment, information is displayed at a prescribed location within the viewer's field of view. For example, if any reflector 42 is detected, then an icon or position relevant data may flash at a prescribed position (e.g., lower right hand corner) of the field of view. In a preferred embodiment of a head mounted display, such icon is substantially fixed relative to the head position. As the viewer's head moves the apparatus 50, the icon stays in the lower right hand corner for as long as reflected light from the reflector 42 is received by the display. Once the display is no longer aligned to the reflector 42, the icon disappears.

In another example, a given type of reflector (e.g., reflector 42a) is positioned on a target object in the environment. The processing system 60 is programmed to identify the target object associated with such reflector type. Whenever such reflector type 42a is encountered, the processing system 60 sends image data to the apparatus 50 to display textual information about the associated target object. In an exemplary embodiment such textual information is displayed at a prescribed location of the field of view (e.g., upper left hand portion). Such textual information may include an identity and/or characteristics of the target object scanned as preprogrammed into the processing system 60.

Figure 7:
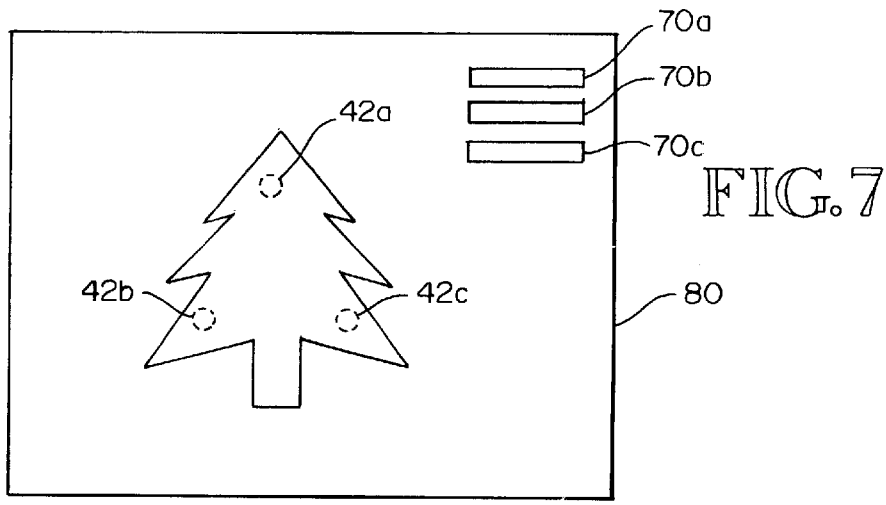
FIG. 7 is a diagram of a display field of view for one method of processing reflector detection.
Figure 8:
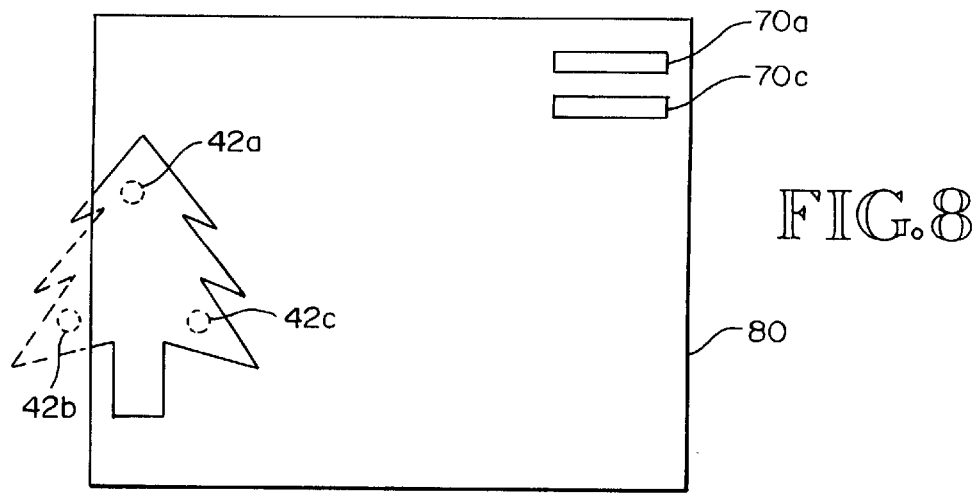
FIG. 8 is a diagram of a display field of view for another view using the processing method of FIG. 7.

FIG. 7 shows an example, where three reflectors 42a–42c are within a viewer's field of view and are scanned by the infrared light 36. Textual information 70a–70c is displayed in the upper right hand portion of the field of view for each object corresponding to an associated reflector 42a–42c. Thus, information 70a corresponds to reflector 42a, information 70b corresponds to target 42b and information 42c corresponds to reflector 42c. Such information 70a–c may be text, graphic or other imagery. As the viewer moves, thereby changing the field of view, the information 70 remains fixed in the upper right hand portion of the field of view. When a reflector passes out of the field of view, however, the corresponding information is removed. FIG. 8 shows an example where the position or orientation of the apparatus 50 has been altered to have reflector 42b occur outside the field of view 80. In response the corresponding information 70b is removed from the field of view 80.

Figure 9:
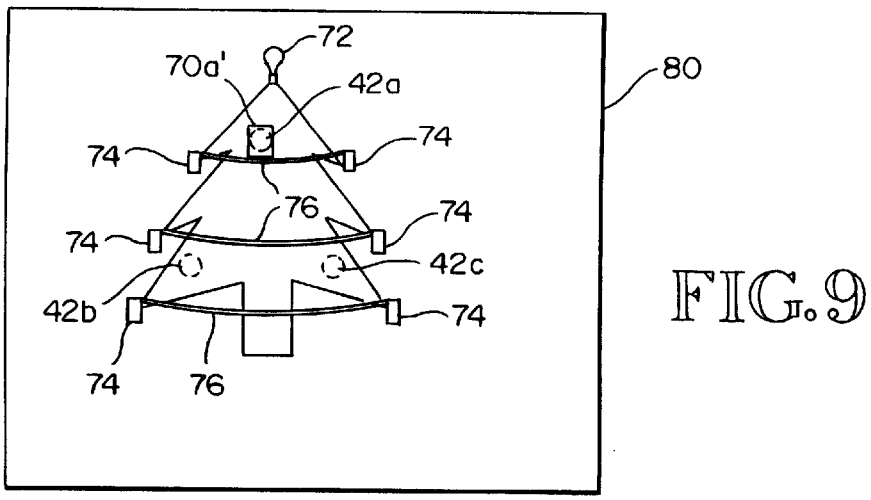
FIG. 9 is a diagram of a display field of view for another method for processing reflector detection.

FIG. 9 shows another processing method in which information is generated when a reflector 42 is scanned. In this embodiment the information is fixed relative to the environment rather than the field of view 80. In one example, graphical information 70a' is overlaid onto the position where the reflector 42a is located. In another example, where multiple reflectors 42a–42c are detected a position of the apparatus 50 relative to the environment 40 is able to be triangulated. Specifically the position of each reflector 42a–42c in the environment 40 is known. Thus, the relative spacing of the reflectors 42a–42c within the scan pattern allow the apparatus 50 location to be triangulated relative to the reflectors 42. With the position known, virtual imagery is placed within the environment 40 at one or more desired locations. In the example illustrated, virtual image decorations 72–76 are overlaid onto a background real image of a Christmas tree from the real world environment. As the apparatus 50 position or orientation changes, the ornaments 72–76 continue to be overlaid onto the tree at the same positions relative to the tree. When virtual image ornaments pass from the field of view 80 they are no longer displayed. Also, when there are an insufficient number of reflectors 42 to triangulate a position of the apparatus 50 relative to the tree, then the virtual imagery is no longer displayed on the tree.

While the position of the reflectors 42a–c has been described herein as being within the field of view, the reflectors 42a–c may be outside the field of view in some applications. For example, the infrared light beam may be broadened optically such that the infrared light extends beyond the user's field of view. This configuration can decrease lag time for data to appear because the infrared detector can locate a reflector 42a–c before the reflector 42a–c is within the field of view.

Light Source

Returning to FIG. 3, the light source 52 includes multiple light sources. One light source emits infrared light. One or more other light sources emit visible light. For generating a monochrome image a monochrome visible light source is used. For color imaging, multiple visible light sources are used. Exemplary visible light sources are colored lasers, laser diodes or light emitting diodes (LEDs). An exemplary infrared light source is an infrared LED or laser diode. Although LEDs typically do not output coherent light, lenses are used in one embodiment to shrink the apparent size of the LED light sources and achieve flatter wave fronts. In a preferred LED embodiment a single mode monofilament optical fiber receives the LED output to define a point source which outputs light approximating spatially coherent light.

Where the light source 52 is externally modulated, the apparatus 50 also includes a modulator 53 responsive to an image data signal received from the image data interface 21. The modulator 53 modulates the visible light emitted by source 52 to define image content for the virtual imagery scanned on a viewer's eye E. Infrared light may also be modulated by the modulator 53, by a separate modulator, or by direct modulation to allow synchronous detection of reflected light.

Additional detail on these and other light source embodiments are found in commonly-assigned U.S. patent application Ser. No., 08/437,818 for "Virtual Retinal Display with Fiber Optic Point Source" filed May 9, 1995, and incorporated herein by reference.

According to alternative embodiments, the light sources or the light generated by the point sources are modulated to include red, green, and/or blue components at a given point (e.g., pixel) of a resulting image. Respective beams of the point sources are modulated to introduce color components at a given pixel.

Drive Electronics

As noted above, the virtual retinal display with tracking system 50 is an output device which receives image data to be displayed. Such image data is received as an image data signal at the drive electronics 21 from a processing system 60. In various embodiments, the image data signal is a video or other image signal, such as an RGB signal, NTSC signal, VGA signal or other formatted color or monochrome video or graphics signal. An exemplary embodiment of the drive electronics 21 extracts color component signals and synchronization signals from the received image data signal. In an embodiment in which an image data signal has embedded red, green and blue components, the red signal is extracted and routed to the red source or to a corresponding modulator for modulating a red light point source output. Similarly, the green signal is extracted and routed to a green source or a corresponding modulator for modulating the green light point source output. Also, the blue signal is extracted and routed to a blue source or a corresponding modulator for modulating the blue light point source output.

The drive electronics 21 also extract a horizontal synchronization component and vertical synchronization component from the image data signal. In one embodiment, such signals define respective frequencies for horizontal scanner and vertical scanner drive signals routed to the scanning subsystem 26.

Scanning Subsystem

The scanning subsystem 26 is located after the light sources 52, either before or after the optics subsystem 24. The scanning subsystem 26 receives both the visible light and the infrared light. As shown in FIG. 5, the scanning system 26 also receives the reflected infrared light 44 re-entering the apparatus 50 upon reflection from an infrared reflector 42. In one embodiment the scanning subsystem 26 includes a resonant scanner 200 for performing horizontal beam deflection and a galvanometer for performing vertical beam deflection. The scanner 200 serving as the horizontal scanner receives a drive signal having a frequency defined by the physical dimensions and properties of the scanner components. The galvanometer serving as the vertical scanner receives a drive signal having a frequency defined by the vertical synchronization signal VSYNC extracted at the drive electronics. Preferably, the horizontal scanner 200 has a resonant frequency corresponding to the horizontal scanning frequency.

Referring to FIG. 10, the scanner 200 includes a mirror 212 driven by a magnetic circuit so as to oscillate at a high frequency about an axis of rotation 214. In one embodiment the only moving parts are the mirror 212 and a spring plate 216. The optical scanner 200 also includes a base plate 217 and a pair of electromagnetic coils 222, 224 with a pair of stator posts 218, 220. Stator coils 222 and 224 are wound in opposite directions about the respective stator posts 218 and 220. The electrical coil windings 222 and 224 may be connected in series or in parallel to a drive circuit as discussed below. Mounted on opposite ends of the base plate 217 are first and second magnets 226, the magnets 226 being equidistant from the stators 218 and 220. The base 217 is formed with a back stop 232 extending up from each end to form respective seats for the magnets 226.

The spring plate 216 is formed of spring steel and is a torsional type of spring having a spring constant determined by its length and width. Respective ends of the spring plate 216 rest on a pole of the respective magnets 226. The magnets 226 are oriented such that they have like poles adjacent the spring plate.

The mirror 212 is mounted directly over the stator posts 218 and 220 such that the axis of rotation 214 of the mirror is equidistant from the stator posts 218 and 220. The mirror 212 is mounted on or coated on a portion of the spring plate.

Magnetic circuits are formed in the optical scanner 200 so as to oscillate the mirror 212 about the axis of rotation 214 in response to an alternating drive signal. One magnetic circuit extends from the top pole of the magnets 226 to the spring plate end 242, through the spring plate 216, across a gap to the stator 218 and through the base 217 back to the magnet 226 through its bottom pole. Another magnetic circuit extends from the top pole of the other magnet 226 to the other spring plate end, through the spring plate 216, across a gap to the stator 218 and through the base 217 back to the magnet 226 through its bottom pole. Similarly, magnet circuits are set up through the stator 220.

When a periodic drive signal such as a square wave is applied to the oppositely wound coils 222 and 224, magnetic fields are created which cause the mirror 212 to oscillate back and forth about the axis of rotation 214. More particularly, when the square wave is high for example, the magnetic field set up by the magnetic circuits through the stator 218 and magnets 226 and 228 cause an end of the mirror to be attracted to the stator 218. At the same time, the magnetic field created by the magnetic circuits extending through the stator 220 and the magnets 226 cause the opposite end of the mirror 212 to be repulsed by the stator 220. Thus, the mirror is caused to rotate about the axis of rotation 214 in one direction. When the square wave goes low, the magnetic field created by the stator 218 repulses the end of the spring plate 216 whereas the stator 220 attracts the other end of the spring plate 216 so as to cause the mirror 212 to rotate about the axis 214 in the opposite direction.

In alternative embodiments, the scanning subsystem 26 instead includes acousto-optical deflectors, electro-optical deflectors, rotating polygons or galvanometers to perform the horizontal and vertical light deflection. In some embodiments, two of the same type of scanning device are used. In other embodiments different types of scanning devices are used for the horizontal scanner and the vertical scanner.

Lensing/Optics Subsystem

The optics subsystem 25 receives the light output from the light sources 52, either directly or after passing through the scanning subsystem 26. In some embodiments the optics subsystem collimates the light. In another embodiment the optics subsystem converges the light. Left undisturbed, the light converges to a focal point then diverges beyond such point. As the converging light is deflected, however, the focal point is deflected. The pattern of deflection defines a pattern of focal points. Such pattern is referred to as an intermediate image plane.

In the embodiment illustrated in FIG. 5, the optics subsystem 25 includes the objective lens 90, a lens 27 for focusing the returning infrared light 44 and the partial infrared mirror 46. The partial infrared mirror 46 passes visible light in either direction. The infrared mirror 46 passes some infrared light impinging on the mirror in one direction, and reflects some infrared light impinging on the mirror in an opposite direction. Infrared light impinging on the mirror 46 from the side closest to the light source 52 is passed. Infrared light impinging on the mirror 46 from the scanning subsystem 26 side is reflected toward the lens 27 and infrared detector 48. The partial infrared mirror 46 is formed by a transparent member having an interference coating of gold flashing or another conventional material which is transparent to visible light and which reflects infrared light. Such coating also is applied to the infrared mirror side of the beamsplitter 54 previously described.

Processing System

The processing system 60 is a general purpose or specialized computer system. The processing system 60 serves as the signal source 23 (see FIG. 3) and defines image content to be displayed by the apparatus 50. According to an aspect of this invention, the processor system 60 responds to the detection of infrared light reflected back into the apparatus 50. By processing the re-entering infrared light, a reflector is identified, a position of the apparatus 50 relative to the environment 40 is determined, image content is defined, and image content position is defined. A reflector is defined based upon the 'bar code' of the reflector detected by detector 48. The position of the apparatus 50 relative to the environment 40 is determined when one or more reflectors are at known positions in the environment 40. Depending on the number of reflectors 42 in the environment 40 the position of the apparatus 50 is detected within various degrees of freedom. With two reflectors in the field of view 80, position of the apparatus 50 to 3 degrees of freedom is determined. With three reflectors 42 in the field of view 80, position of the apparatus 50 is determined within 6 degrees of freedom.

By determining an identification of a reflector, image content is defined based upon a prescribed correlation preprogrammed into the processing system 60. The specific correlation of what to display when a given reflector is scanned is determined based upon a given implementation of the display apparatus 50 and processing system 60. The location of the image content is displayed at a fixed position relative to the field of view 80 or at a fixed position relative to the environment 40. For a case where one reflector 42 is within the field of view 80, the image content is accurately positioned at a position fixed to the background when the fixed position is at the reflector. Specifically, by knowing which pixel of a scan frame correlates to the reflector, image content is fixed at that pixel at a one frame lag. thus, when a reflector is detected and a pixel identified based upon the time at which the reflector was detected, image content is displayed about that pixel location during the next image frame. Each frame the position may vary to track the detected reflector with a one frame lag. Such imagery is accurately positioned to one degree of freedom.

When two reflectors 42 are within the field of view 80, the image content is accurately positioned anywhere within the field of view at a location fixed relative to the background. Such imagery is accurately positioned to 3 degrees of freedom. When three reflectors 42 are within the field of view 80, the image content also is accurately positioned anywhere within the field of view at a location fixed relative to the background. Such imagery is accurately positioned to 6 degrees of freedom.

For each case of one, two or three reflectors in the field of view 80, image content also can be displayed, either alternatively or concurrently, at a position fixed relative to the viewer's field of view 80.

Meritorious and Advantageous Effects

According to one advantage of this invention, there can be a latency of less than one display frame period between when a reflector is detected and when information responsive to such detection is added to the display. According to another advantage of the invention, the positioning of information added to the display as function of reflector detection can be accurate to within one display pixel.

Although a preferred embodiment of the invention has been illustrated and described, various alternatives, modifications and equivalents may be used. Although a tree and virtual ornaments are described, the objects in the real world environment 40 and the information displayed as virtual imagery (e.g., text, graphical or other imagery) may vary. Although the scanning subsystem is described as employing a torsionally flexed spring plate, a variety of other pivoting mechanisms, such as a bending spring or a rotating axle may be used to support the mirror. Further, although the scanning subsystem is preferably a resonantly oscillating device, the display may include a non-resonant scanner and be within the scope of the invention. Moreover, although the scanning subsystem is described as a multi-component assembly, integral structures, such as microelectromechanical devices, may be used. Therefore, the foregoing description should not be taken as limiting the scope of the inventions which are defined by the appended claims.

What is claimed is:

1. A scanning display for use in an environment having one or more surfaces at least partially reflective to infrared light, the display comprising:

a visible light output and an infrared light output that are spatially coupled to deliver the visible light to a viewer's eye and to deliver the infrared light away from the viewer into the environment;

eye coupling optics to couple the visible light to the viewer's eye; and a detector oriented to receive the infrared light reflected from the environment.

2. The display of claim 1, further comprising a modulator to modulate the visible light.

3. The display of claim 1, further comprising a processor coupled to the detector and programmed to determine a viewer's orientation.

4. The display of claim 3, wherein the optics and processor are configured to alter the position of the displayed image in response to detected position.

5. The display of claim 3, wherein the optics and processor are configured to alter the content of the displayed image in response to detected position.

6. A method for determining viewing orientation of a viewer's eye, comprising the steps of:

scanning visible light and tracking light with a moving mirror;

directing the scanned visible light to the viewer's eye;

directing the tracking light away from the viewer to an external environment;

receiving the tracking light reflected back from the external environment; and determining viewing orientation in response to the received tracking light.

* * * * *